United States Patent Office 3,314,495
Patented Apr. 18, 1967

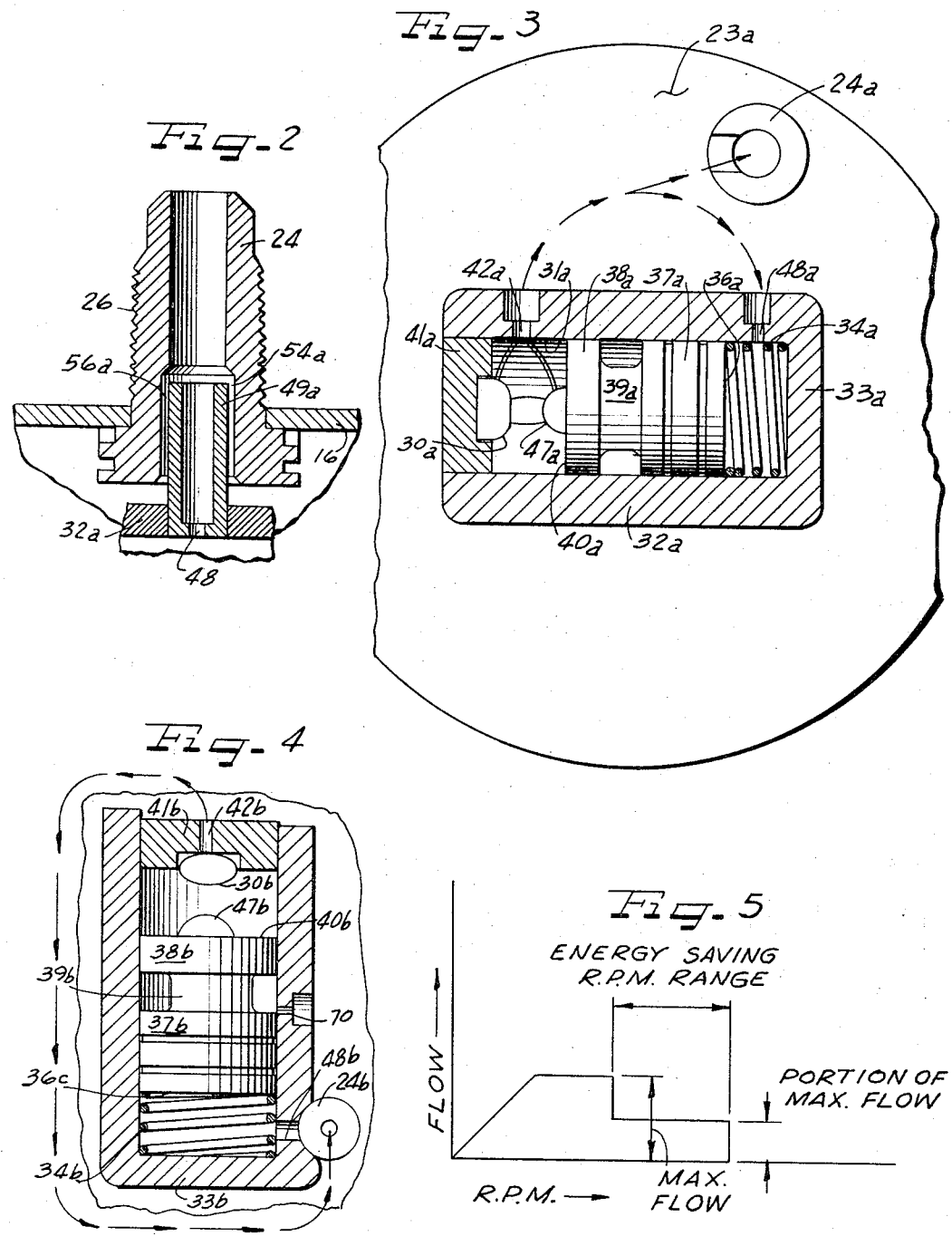

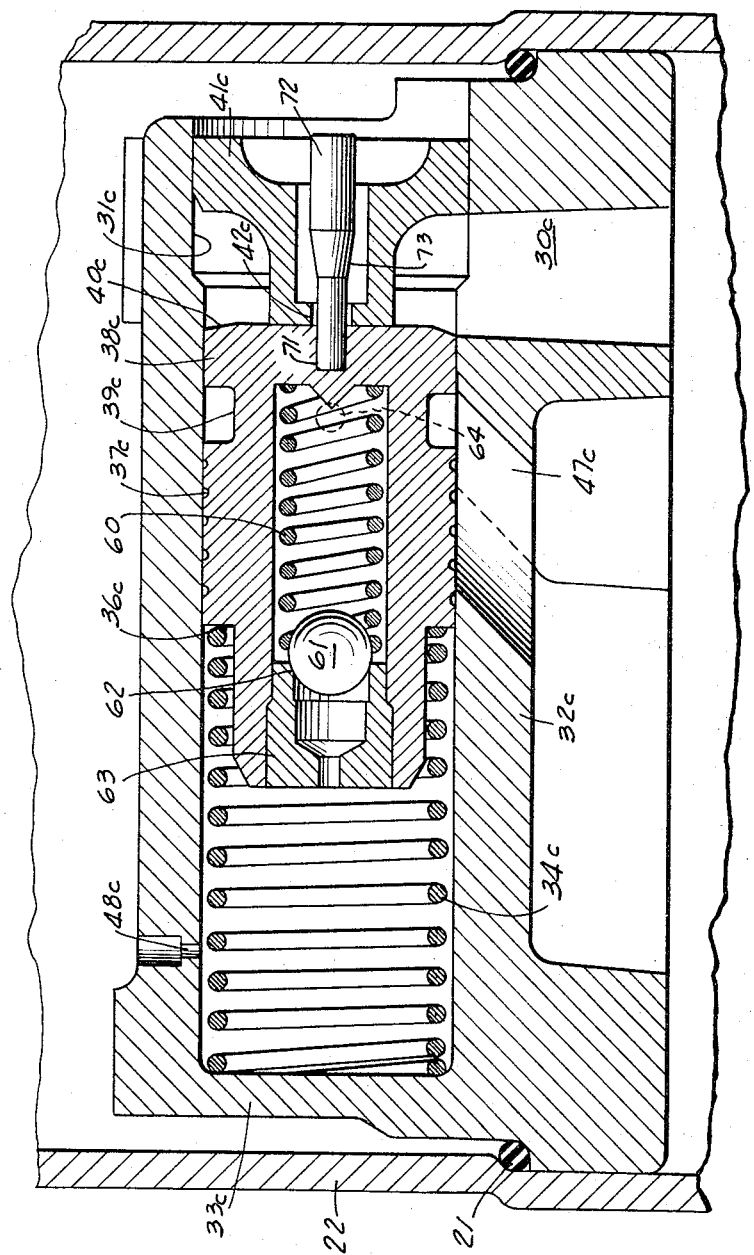

3,314,495
VALVING SYSTEM FOR POWER
STEERING PUMP
Hubert M. Clark, Bloomfield Township, Gilbert H. Drutchas, Birmingham, and Robert E. Carlson, Livonia, Mich., assignors to TRW Inc., a corporation of Ohio
Filed Dec. 7, 1964, Ser. No. 416,457
15 Claims. (Cl. 180—79.2)

This invention relates generally to a valving system for a power steering pump and more specifically relates to a method and means for effecting valve control of liquid flow between the internal and external sections of a hydraulic circuit so that the valve control is characterized by a drooping flow characteristic, that is, so that rising flow characteristics at high speed operation of the vehicle will be countered.

In automotive power assisting systems such as a power steering system, the pressurized fluid is generally supplied by a pump which operates as a function of vehicular speed. However, the maximum demand for power assistance in such a hydraulic circuit is many times completely unrelated to the vehicular speed. As a result, the problem of internal heat rise is vexatious and troublesome.

For example, in a power steering application, the flow control valve setting is usually effected for providing ease of turning when the vehicle is in a parking condition. For instance, two gallons per minute may be desirable as a flow rate in a power steering system of a vehicle when turning efforts during a parking maneuver are to be executed. However, turning efforts at high speeds are considerably less and the excess flow contributes little to the turning effort. Accordingly, the high flow rate available at high vehicular speeds is thus a heat factor of detrimental form.

It is an object of the present invention, therefore, to provide a hydraulic circuit and a valving system wherein flow may be reduced at higher vehicular speeds.

Another object of the present invention is to provide a valving control system which exhibits a drooping flow characteristic.

Yet another object of the present invention is to provide a valving system for a hydraulic circuit wherein undesirable heat rise will be minimized.

Many other features, advantages and additional objects of the present invention will become manifest to those versed in the art upon making reference to the detailed description which follows and the accompanying sheets of drawings in which a preferred structural embodiment incorporating the principles of the present invention is shown by way of illustrative example. The methods contemplated by the present invention will be clearly understood from the description of the various forms of apparatus provided and described.

On the drawings:

FIGURE 2 is a fragmentary cross-sectional view of a portion of the valve control assembly illustrating an alternative arrangement of the parts but in the same general organization as illustrated in FIGURE 1;

FIGURE 3 is an alternative valving construction partly schematic provided in accordance with the principles of the present invention;

FIGURE 4 is yet another alternative valving construction provided in accordance with the principles of the present invention;

FIGURE 5 is a graph showing the flow curve of the pump to the steering gear and illustrating the operation of the valving systems provided in accordance with the principles of the present invention; and FIGURE 6 is another alternative form of valve construction provided in accordance with the principles of the present invention.

As shown on the drawings:

Figure 1:
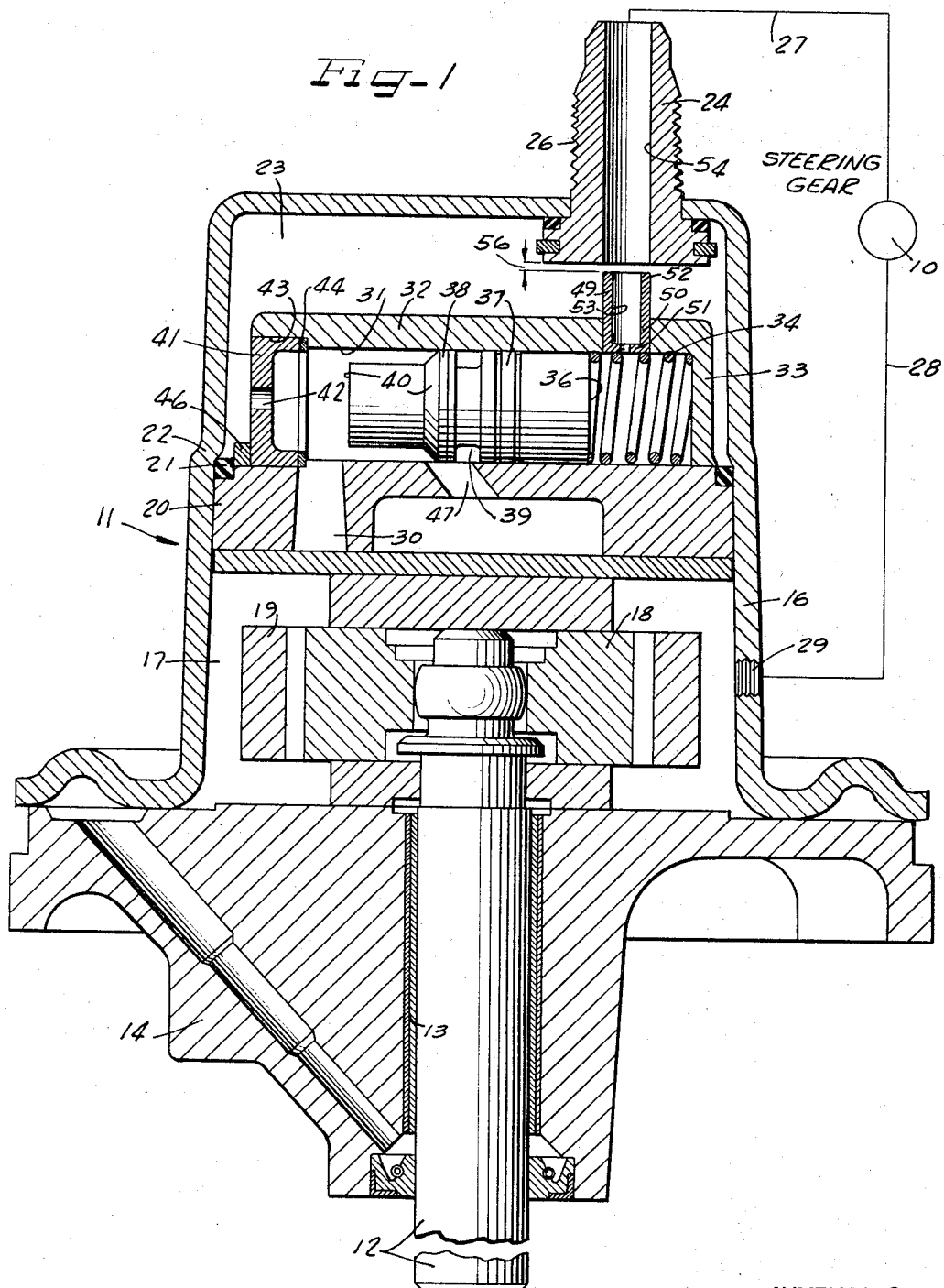
FIGURE 1 is a cross-sectional view of a power steering pump incorporating the principles of the present invention and is shown in schematic association with a vehicular power steering system.

Although the principles of the present invention are of general utility in any vehicular power assisting system, a particularly useful application is made to a vehicular power steering system and, accordingly, there is illustrated in FIGURE 1 a steering gear 10 which is adapted to be power assisted and it will be understood that such steering gear may constitute any steering gear incorporated in an automotive vehicle equipped with power steering.

With such a vehicular power steering system, there is usually provided a pump which is operated as an engine accessory and is, therefore, driven as a function of the vehicular speed. In accordance with the principles of the present invention, there is provided such a pump which is shown generally at 11 and comprises a drive shaft 12 which is rotatably driven as a function of vehicular speed. The shaft is journalled in a bearing means 13 carried by a pump body 14 associated with a pump cover 16 which provides a reservoir 17 for the hydraulic circuit, which reservoir surrounds the pumping unit rotatably driven by the shaft 12. Although all of the details of the pump construction are not necessary to a proper understanding of the principles of the present invention, it may be noted that there is provided a rotor 18 which may be of the type carrying a plurality of slippers which are free to rock angularly and to move radially in following the contour of a bore provided by a ring 19. The pump is provided with various spacers, valve plates, sealing rings and other parts necessary to make an operative construction and it will suffice, for the present purposes, to note that the pump has its own flow control valve integrally incorporated therein as shown in the upper portion of FIGURE 1. Thus, a valve plate 20 is sealed as at 21 in the cover 16 against an embossed shoulder 22, thereby partitioning the interior of the cover 16 into the reservoir section 17 and a high pressure section 23 which actually constitutes a portion of the external section of a hydraulic circuit. A nipple 24 is firmly affixed in the wall of the cover 16 and is externally threaded as at 26 for connection to appropriate conduit means 27 leading to the steering gear 10. A return conduit 28 carries the spent fluid back to the reservoir 17 via a fitting 29.

Liquid at pump generated pressure is furnished to an ingress port 30 communicating with a valve bore 31 of generally cylindrical configuration and formed in a valve body 32. One end of the valve bore 31 is closed by a radial wall 33 against which is bottomed one end of a continuous biasing means such as a coil spring 34. The other end of the coil spring is bottomed against a motive surface 36 formed as a radial wall on the end of a spool valve having peripheral lands 37 and 38 separated by an annular recess 39. The other end of the spool valve has motive surfaces indicated at 40, which surfaces 40 are subjected to pump-generated pressure discharged into the valve bore through the ingress port 30.

A plug 41 having a flow orifice 42 formed therein is fit within an enlarged recess 43 formed in the end of the valve body 32. A seal ring is shown at 44 and a retainer is indicated at 46, thereby locking the plug 41 in place. The function of the flow orifice 42 is to direct pressurized fluid from the valve bore 31 forming a part of the internal hydraulic circuit, or the internal section of the hydraulic circuit, and into the chamber 23 which forms an external section of the hydraulic circuit.

The valve body 32 is also provided with a bypass port 47 formed in the peripheral wall of the valve bore 31 and adapted to be controlled by the lands 37 and 38 of the spool valve. It will be noted that the continuous biasing means 34 tends to bias the spool valve towards a closed position. In order to render the spool valve responsive to the pressure differential across the flow orifice 42 or, in other words, responsive to the pressure differential between the internal and external sections of the hydraulic circuit, there is provided a sensing orifice 48 which communicates the fluid pressure in the external section of the circuit to the portion of the valve bore 31 behind the motive surface 36.

In this particuluar embodiment, the sensing orifice 48 is formed by a cup-shaped cylinder 49 which fits into an opening 50 formed in the peripheral wall of the valve bore 31. The orifice 48 is formed in a radial wall 51 and a generally tubular side wall 52 extends upwardly and forms an enlarged recess 53 disposed in substantial registry with the internal passage 54 formed in the nipple 24.

It will be noted there is a spacing dimension indicated at 56 which constitutes a clearance through which the liquid flows from the chamber 23 into the passage 54.

In operation, liquid flowing from the ingress port 30 passes through the primary flow orifice 42 and into the chamber 23 for discharge to the point of utilization through the clearance 56 and into the passage 54. The clearance 56 is set such that an increase in velocity beyond the opening clearance 56 causes an aspirator effect at the sense orifice 48 tending to reduce the pressure acting on the motive surface 36. Accordingly, the spool valve will then open wider and permit more fluid to by-pass through the by-pass port 47. Rising flow characteristics attributable to increased vehicular speed are thus countered by an increased valve opening at the by-pass port 47 correcting the tendency of the flow valve to increase flow during successive valve-opening positions.

As shown in FIGURE 2, the same effect may be created by providing a diametral clearance between the outside diameter of the thimble shown in FIGURE 2 at 49a and a specifically machined recess shown in FIGURE 2 at 54a. The diametral clearance referred to is identified in FIGURE 2 for clarity of understanding at 56a.

In FIGURE 3 a valve chamber is indicated schematically at 23a and includes an outlet fitting 24a leading to the steering gear. The valve body is indicated at 32a and has a generally cylindrical configuration and includes a radial end wall 33a closing one end of a valve bore 31a. The other end of the valve bore 31a is closed by a plug 41a. A spring 34a is bottomed against the radial wall 33a and has its other end bottomed against the spool valve which is again characterized by a peripheral surface having axially spaced lands 37a and 38a separated by a recess 39a.

The valve body 32a is provided with an ingress port 30a and fluid generated by a pump is supplied into the valve bore 31a. A by-pass port 47a directs excess liquid back to the pump.

A sensing orifice 48a formed in the peripheral wall of the valve body 32a communicates pressure from the external section of the hydraulic circuit (23a) to that portion of the valve bore 31a communicating with the motive suruface 36a on the rear of the spool valve.

Thus, liquid entering the valve bore 31a through the ingress port 30a subjects the motive surface 40a on the end of the spool valve to pressure in the internal section of the hydraulic circuit. A primary flow orifice 42a is formed in the valve body and communicates liquid from the internal section of the circuit to the external section of the circuit.

It is specifically contemplated that the flow orifice 42a be placed in spatial proximity to the by-pass port 47a. Thus, the flow through the by-pass port 47a when open causes a flowing motion to pass near the orifice 42a, thereby reducing the effectiveness of the orifice 42a in flowing liquid to the external circuit 23a. Thus, the effectiveness of the orifice 42a will be influenced by the by-pass flow stream in such a way that the greater the by-pass flow, the less flow proportionally through the orifice 42a. Accordingly, the valve is thus given a drooping flow characteristic.

In the form of the invention shown in FIGURE 4, the valve body is identified at 32b and has a radial end wall 33b bottoming a coil spring 34b, the other end of which is bottomed against a spool valve having spaced lands 37b and 38b separated by an annular recess 39b.

The valve body 32b has formed therein an ingress port 30b communicating pump-generated pressure to the interior of the valve body.

A plug 41b has a primary flow orifice 42b formed therein through which liquid is discharged to communicate the external circuit with the internal section of the hydraulic circuit.

The valve body 32b is formed with a by-pass port 47b through which excess liquid is discharged under the control of the spool valve normally biased towards closed position by the spring 34b but having a motive surface 40b disposed on a radial wall of the end of the spool valve, thereby to be pressure-biased against the spring biasing force.

The peripheral wall of the valve body 32b is formed with a sensing oifice 48b which communicates with an outlet 24b.

In accordance with the principles of the present invention, a dumping or exhaust orifice 70 is formed in the peripheral wall of the valve body and is positioned longitudinally with respect to the path of movement of the spool valve so that the orifice 70 is timed to coincide with that movement of the lands 37b and 38b of the spool valve and the spring 34b which is related to the speed of the vehicle.

In FIGURE 6, the ingress port is shown at 30c and is formed in one wall of a valve body 32c in order to discharge pressurized liquid at pump-generated pressure into the valve bore 31c. The end of the valve body is provided with a radial wall 33c bottoming a spring 34c which is engaged against the end of a spool valve having spaced lands 37c and 38c on opposite sides of an annular recess 39c.

The rear motive surfaces of the spool valve are shown at 36c and the motive surface on the front end of the valve spool is shown at 40c. A by-pass port 47c is controlled by the spool valve and the primary flow orifice is shown at 42c formed in a plug-type fitting 41c carried in the end of the valve bore 31c. In this particular embodiment, the rear motive surface 36c of the spool valve is recessed to seat an additional coil spring 60, thereby to bias a ball valve 61 against a valve seat 62 formed by a bushing 63 assembled in the end of the spool valve. The ball valve 61 constitutes a safety valve and when open discharges liquid to an opening 64 communicating with the recess 39c leading to the by-pass port 47c. A sensing orifice is provided at 48c in order to communicate the motive surface 36c with the external section of the hydraulic circuit.

In this form of the invention, the head of the spool valve is formed with a recess 71 in which is inserted in press fit relationship a metering rod 72 having a metering surface 73. In the form of the invention shown, the metering surface 73 is tapered, however, it could also be stepped or could include a series of steps. The metering rod extends through the primary flow orifice 42c. At that movement of the spool valve and the spring 34c related to the speed of the vehicle, the metering rod will be moved relative to the flow orifice 42c so that the thicker end of the tapered portion 73 will reduce the effective size of the flow orifice, thereby rendering the flow orifice less effective for the transmission of pressurized liquid to the external section of the circuit. Accordingly, the valve is thus provided with a drooping flow characteristic.

In all versions of the invention, it will be evident that the operation is depicted in FIGURE 5 wherein the ultimate flow curve of the pump to the steering gear is illustrated by plotting flow rate against pump r.p.m. As depicted by the legends, the flow rate normally increases in a straight line relationship as r.p.m. increases until maximum flow is reached, whereupon the curve flattens at the rated flow delivery of the pump. In accordance with the principles of the present invention, an energy-saving r.p.m. range is effected by reducing a portion of the maximum flow through the utilization of a valving system having a drooping flow characteristic, thereby reducing temperature increase and countering the rising flow characteristics. While the curve shown in FIGURE 5 shows a sharp cut-off, it will be evident that a sloping curve would result if the reduction in flow were effected gradually.

Although minor modifications might be suggested by those versed in the art, it should be understood that we wish to embody within the scope of the patent warranted hereon all such modifications as reasonably and properly come within the scope of our contribution to the art.

We claim as our invention:

1. The method of controlling a power-assisted hydraulic system in a vehicle which includes the steps of
    forming a closed hydraulic circuit,
    at one point in the circuit forming an internal section for a pump to drive a supply of fluid in the form of a stream at increased pressure with the operating speed of the pump being a function of the vehicle speed,
    at a second point in the circuit forming an external section of the circuit for a power assisting device to utilize the pressurized stream,
    controlling the admission of fluid from the internal section to the external section as a function of the flow rate through a flow orifice while by-passing all excess flow internally to said one point,
    and adding to the flow rate factor controlling said by-pass flow an additional factor corresponding to or responsive to the vehicular speed,
thereby countering any rising flow characteristics.

2. A valving system for a vehicular power assisted hydraulic system comprising,
    means forming a hydraulic circuit including an internal circuit and an external circuit,
    a pump in said internal circuit driven as an accessory of the vehicle at speeds which are generally proportional to vehicular speeds,
thereby to drive a supply of fluid in said circuit in the form of a stream,
    utilization means in said external circuit for utilizing the pressurized stream,
    valve means including
        a flow control orifice for controlling the admission of fluid from said internal circuit to said external circuit,
        means forming a by-pass passage from said internal circuit ahead of said flow control orifice to the inlet side of said pump,
    said valve means further including flow responsive means regulating the operation of said by-pass passage as a function of the flow rate through said orifice,
    and means for rendering said flow responsive means less effective as a function of conditions corresponding to increased vehicular speed,
thereby countering any rising flow characteristics.

3. A valving system comprising,
    a valve body having an internal hydraulic circuitry including a hollow bore and having external hydraulic circuitry for directing fluid to a point of utilization,
    a spool valve in said body movable axially in said bore,
    a spring in one end of said bore bottomed at one end against said valve body and engaging said spool valve to urge said spool valve in one direction,
    an orifice formed at the other end of said valve body for directing fluid from said internal hydraulic circuitry to said external hydraulic circuitry,
        said valve body having an ingress port for directing fluid from a source at increased pressure into said bore and against the front end of said spool valve,
        said valve body having a by-pass port controlled by said spool valve and leading to a zone of reduced pressure,
        said valve body having a sensing orifice communicating the rear of said spool valve to the pressure of said external circuitry,
    thereby making said spool valve responsive to the flow rate through the orifice as represented by the pressure rate differential between the internal and external circuits,
        and means increasing the pressure rate differential at successive movements of the spool valve related to increased speed of the vehicle.

4. A valving system as defined in claim 3 wherein said means for increasing the pressure rate differential comprises,
    a dumping orifice formed in said valve body communicating with the external circuit,
    and said spool valve having an annular recess communicating with said dumping orifice, the position of the dumping orifice being timed with respect to said spool valve to coincide with that movement of the spool valve and the spring related to the speed of the vehicle so that the valve exhibits a drooping flow characteristic.

5. A valving system as defined in claim 3 wherein said means for increasing the pressure rate differential comprises,
    means forming a passage between said flow orifice and said by-pass port which places said flow orifice in such operative proximity to said by-pass port when the by-pass port is open that a flowing motion passes the flow orifice and reduces the effectiveness of the flow orifice in flowing fluid to the external circuit,
thereby giving the valve a drooping flow characteristic.

6. A valve system as defined in claim 3 wherein said means for increasing the pressure rate differential comprises,
    aspirator means at said sensing orifice for reducing the pressure acting on the rear of the spool valve,
thereby opening the valve wider and giving the valve a drooping flow characteristic.

7. A valve system as defined in claim 3 wherein said means for increasing the pressure rate differential comprises,
    a metering rod extending into said flow orifice and reducing the effective cross-sectional area thereof on movements of the valve related to vehicular speed,
thereby giving the valve system a drooping flow characteristic.

8. A valving system for use in a vehicular hydraulic circuit having an internal section and an external section supplied by a vehicular accessory driven as a function of vehicle speed comprising,
    a generally cylindrical valve body having a radial wall closing one end,
        and forming a cylindrical valve bore extending axially from said wall out of the other end of said body,
    a spool valve having a peripheral surface comprising two axially spaced lands separated by an annular recess,
        said spool valve having a first and second motive surface each extending radially at opposite ends of the valve and being spaced apart from each other less than the axial spacing dimension of said valve bore, a plug in the other end of said valve bore having an orifice formed therein through which liquid passes from the internal section of the circuit to the external section of the circuit, said valve body having an ingress port formed therein admitting liquid from a source at increased pressure into said valve body for flow through said orifice and subjecting one of said motive surfaces to increased pressure, thereby tending to move the spool valve towards the other end of the valve bore, said valve body having a by-pass port formed in the peripheral wall thereof for control by one of said lands and by-passing excess liquid from said valve body back to the source or a zone of reduced pressure when the valve is pressure-biased open, a spring bottomed against said radial wall and against the other motive surface of said valve tending to spring-bias the spool valve closed, a sensing orifice formed in said peripheral wall of said valve body communicating fluid pressure in the external section of the circuit against said other motive surface and assisting said spring in biasing the valve towards closed position, and an additional orifice formed in said peripheral wall of said valve body for control by the other of said lands and communicating fluid pressure in the external section of the circuit into said annular recess for action on the spool valve, said additional orifice being spaced longitudinally to coincide in timing with the movement of the spool valve and the spring related to the speed of the vehicle, thereby giving the valve a drooping flow characteristic.

9. A valving system for use in a vehicular hydraulic circuit having an internal section and a external section supplied by a vehicle accessory driven as a function of vehicle speed comprising, a generally cylindrical valve body having radial end walls closing opposite ends and having formed therein a cylindrical valve bore between said radial end walls, said valve body having formed therein an ingress port admitting liquid into said valve body from a source at increased pressure, a spool valve in said valve body having peripheral lands and recesses and radial motive surfaces at opposing ends, a spring bottomed against one radial end wall and against said spool valve at one of said motive surfaces, a by-pass port formed in the peripheral wall of said valve body controlled by the lands of said spool valve, a sensing orifice formed in the peripheral wall of said valve body to communicate fluid pressure from the external section of the circuit to said one motive surface, whereby the pressure and the spring acting on said one motive surface tends to close said by-pass port, and a flow orifice formed in said valve body to flow liquid from the internal circuit to the external circuit, said flow orifice being spaced in such proximity to said by-pass port that the flow to the by-pass port when open reduces the effectiveness of the flow orifice in flowing liquid to the external circuit, thereby giving the valve a drooping flow characteristic.

10. A valving system for use in a vehicular hydraulic circuit having an internal section and an external section supplied by a vehicle accessory driven as a function of vehicle speed comprising, a valve body having a cylindrical valve bore formed with a radial wall at one end and a flow orifice at the opposite end for directing liquid into the external circuit, a valve spool having peripheral lands and recesses and movable in said valve bore, a by-pass port formed in the peripheral wall of said valve bore for control by the lands of the valve upon movement thereof, and a spring bottomed against said radial wall and against said valve spool tending to move said valve towards closed position, an ingress port formed in said valve body for admitting liquid from a source at increased pressure into the valve body for flow through said flow orifice, first means forming a sensing orifice communicating fluid pressure from the external circuit to the spring-biased end of the spool valve, and second means forming together with said first means an aspirating means to reduce the pressure acting on the spring-biased end of the valve for giving the valve a drooping flow characteristic.

11. In combination, a valving system for a vehicular power steering circuit comprising, a pump driven as a function of vehicular speed and pressurizing a source of liquid for delivery as a stream from an internal section of a hydraulic circuit to an external section of the circuit, a spool valve having a movable valve member formed with peripheral lands and recesses and radial motive surfaces, and a valve body having a valve bore in which said valve member moves, said valve body having formed therein an ingress port for discharging liquid at pump-generated pressure into the valve body, a flow orifice for flowing the pressurized liquid to the external circuit and the point of utilization, a by-pass port controlled by the valve to by-pass excess liquid from the valve body back to the pump, and a sensing orifice for communicating fluid pressure from the external circuit to the rear of the valve member, continuous biasing means engaged against the rear of the valve member and together with the external fluid pressure tending to bias the valve closed, said valve opening against the bias as a function of the pressure differential between the internal and external sections of the circuit on opposite sides of the flow orifice, and means for increasing the pressure differential acting on the valve as a function of vehicle speed, thereby giving the valve a drooping flow characteristic.

12. The method of controlling a pressurized fluid stream in an external section of a vehicular hydraulic circuit with a flow responsive linearly movable spring-biased spool valve which includes the steps of generating pressure in the internal section of the circuit as a function of vehicle speed, opening the valve against the spring bias as a function of a pressure differential on opposite sides of a flow orifice corresponding to pressures in the external section and the internal section of the circuit, thereby controlling the flow in the external section as a function of the flow in the internal section, and increasing the pressure differential as a function of vehicle speed to give the control a drooping flow characteristic.

13. A flow regulator for a vehicular power assisting hydraulic circuit comprising means forming a valve chamber having axially spaced lands and openings forming internal and external sections of a hydraulic circuit, a spool valve linearly movable in said chamber, one of said openings comprising a by-pass port controlled by said valve, another of said openings comprising an ingresss port, pumping means operable as a function of vehicular speed for supplying pressurized liquid to said ingress port, a flow orifice formed in said valve chamber for flowing liquid from said internal section to the external section of the circuit, control biasing means biasing said valve closed, motive surfaces on said valve subject to pressures in said internal and external sections of said circuit to adjust the valve against said control biasing means as a function of the pressure differential in the internal and external sections of the circuit, and means for increasing the pressure differential as a function of vehicle speed.

14. A flow regulator for a vehicular power assisted hydraulic circuit as defined in claim 13 wherein said means for increasing the pressure differential comprises a tapered metering rod extending into said flow orifice to reduce the flow to the external circuit upon movements of the valve related to vehicle speed.

15. A valving system for use in a vehicular hydraulic circuit having an internal section and an external section supplied by a vehicle accessory driven as a function of vehicle speed comprising, a generally cylindrical valve body having a radial wall closing one end and forming a cylindrical valve bore extending axially from said wall out of the other end of said body, a spool valve having a peripheral surface comprising two axially spaced lands separated by an annular recess, said spool valve having first and second motive surfaces extending radially at opposite ends of said valve and being spaced apart less than the axial dimension of said valve bore, a plug in the other end of said valve bore having a flow orifice formed therein through which liquid passes from the internal section of the circuit to the external section of the circuit, said valve body having an ingress port formed therein admitting liquid from a source at increased pressure into said valve body for flow through said flow orifice, and subjecting one of said motive surfaces to increased pressure, thereby tending to move the spool valve towards the other end of the valve bore, said valve body having a by-pass port formed in the peripheral wall thereof for control by one of said lands and by-passing excess liquid from said valve body back to the source or a zone of reduced pressure when the valve is pressure-biased open, a spring bottomed against said radial wall and against the other motive surface of said valve tending to spring-bias the spool valve closed, a sensing orifice formed in said peripheral wall of said valve body communicating fluid pressure in the external section of the circuit against said other motive surface and assisting said spring in biasing the valve towards closed position, whereby the movement of the valve is controlled as a function of the flow rate and the pressure drop across said flow orifice, and a metering rod attached to said spool valve and extending outwardly through said flow orifice, said metering rod having a tapered peripheral wall and being movable in unison with said spool valve to reduce the effective cross-sectional area of the flow orifice as a function of those movements of the spool valve and the spring related to vehicle speed, thereby giving the valve a drooping flow characteristic.

References Cited by the Examiner

UNITED STATES PATENTS 3,024,798  3/1962  Banker _____ 137—117
3,227,239  1/1966  Villarreal _____ 180—79.2

MILTON BUCHLER, *Primary Examiner.*

BENJAMIN HERSH, *Examiner.*

H. H. BRANNEN, *Assistant Examiner.*